(12) United States Patent
Ito et al.

(10) Patent No.: US 10,746,282 B2
(45) Date of Patent: Aug. 18, 2020

(54) VEHICLE DRIVE DEVICE

(71) Applicants: TOYOTA JIDOSHA KABUSHIKI KAISHA, Toyota-shi, Aichi (JP); AISIN AW CO., LTD., Anjo-shi, Aichi (JP)

(72) Inventors: Eiji Ito, Nisshin (JP); Kiyonori Takagi, Okazaki (JP); Kazuki Toya, Anjo (JP); Yuki Kawamoto, Anjo (JP); Naoya Jinnai, Anjo (JP)

(73) Assignees: TOYOTA JIDOSHA KABUSHIKI KAISHA, Toyota (JP); AISIN AW CO., LTD., Aichi (JP)

( * ) Notice: Subject to any disclaimer, the term of this patent is extended or adjusted under 35 U.S.C. 154(b) by 42 days.

(21) Appl. No.: 16/271,121

(22) Filed: Feb. 8, 2019

(65) Prior Publication Data
US 2019/0249765 A1  Aug. 15, 2019

(30) Foreign Application Priority Data

Feb. 9, 2018 (JP) .................................. 2018-022507

(51) Int. Cl.
*F16H 57/04* (2010.01)
*F16H 48/08* (2006.01)
(Continued)

(52) U.S. Cl.
CPC ........... *F16H 57/0427* (2013.01); *B60K 1/00* (2013.01); *F16H 48/08* (2013.01); *F16H 48/40* (2013.01);
(Continued)

(58) Field of Classification Search
CPC ............. F16H 57/0495; F16H 57/0424; F16H 57/0423; F16H 57/0457; F16H 57/0483; F16H 57/045; F16H 57/0421
See application file for complete search history.

(56) References Cited

U.S. PATENT DOCUMENTS 3,529,698 A    9/1970  Nelson et al.
4,018,097 A *  4/1977  Ross ..................... F16H 57/037
                                                 74/467
(Continued)

FOREIGN PATENT DOCUMENTS

EP     2 700 849 A1    2/2014
JP     2001271916 A *  10/2001  ......... F16H 57/0421
(Continued)

*Primary Examiner* — Sherry L Estremsky
(74) *Attorney, Agent, or Firm* — Oliff PLC (57) ABSTRACT

A vehicle drive device comprises: a power transmission mechanism transmitting a drive power from a drive power source to a plurality of wheels; a differential gear mechanism provided in the power transmission mechanism and distributing the drive power input from the drive power source to the plurality of wheels; a casing housing the power transmission mechanism; and an oil pump sucking a lubricating oil stored in the casing, and the device drives the oil pump in conjunction with rotation of the differential gear mechanism. In the device, a catch tank storing the lubricating oil is provided in the casing, an introduction path is formed in the casing for introducing the lubricating oil scooped up by the differential gear mechanism during backward running of a vehicle into the catch tank, and a discharge oil passage connected to a discharge port of the oil pump is connected to the catch tank.

7 Claims, 7 Drawing Sheets

(51) Int. Cl.
*F16H 48/40* (2012.01)
*B60K 1/00* (2006.01)
*F16H 57/037* (2012.01)
*F16H 57/02* (2012.01)

(52) U.S. Cl.
CPC ......... *F16H 57/043* (2013.01); *F16H 57/045* (2013.01); *F16H 57/0423* (2013.01); *F16H 57/0424* (2013.01); *F16H 57/0426* (2013.01); *F16H 57/0435* (2013.01); *F16H 57/0441* (2013.01); *F16H 57/0457* (2013.01); *F16H 57/0476* (2013.01); *F16H 57/0483* (2013.01); *F16H 57/0495* (2013.01); *B60K 2001/001* (2013.01); *F16H 57/037* (2013.01); *F16H 2057/02034* (2013.01)

(56) References Cited

U.S. PATENT DOCUMENTS

| | | | |
|---|---|---|---|
| 8,459,134 B2 * | 6/2013 | Harashima | F04C 2/10 74/325 |
| 9,309,959 B2 * | 4/2016 | Ishikawa | F16H 57/027 |
| 9,593,762 B2 * | 3/2017 | Lenczewski | F16H 57/0483 |
| 10,309,524 B2 * | 6/2019 | Kiyokami | F16H 57/0475 |
| 2003/0000337 A1 * | 1/2003 | Camping | F16H 57/0483 74/655 |
| 2013/0145879 A1 | 6/2013 | Nakamura et al. | |

FOREIGN PATENT DOCUMENTS

| | | |
|---|---|---|
| JP | 2013-119918 A | 6/2013 |
| WO | 2010/100541 A1 | 9/2010 |
| WO | 2018/061443 A1 | 4/2018 |

* cited by examiner

VEHICLE DRIVE DEVICE

The disclosure of Japanese Patent Application No. 2018-022507 filed on Feb. 9, 2018 including the specification, drawings and abstract is incorporated herein by reference in its entirety.

BACKGROUND OF THE INVENTION

Field of the Invention

The present invention relates to a vehicle drive device that includes a differential gear mechanism disposed in a power transmission mechanism transmitting a drive power from a drive power source to multiple wheels and that drives an oil pump in conjunction with rotation of the differential gear mechanism, and particularly relates to a technique of suitably preventing a seizure of the oil pump during backward running of a vehicle.

Description of the Related Art

There is known a vehicle drive device that includes (a) a power transmission mechanism transmitting a drive power from a drive power source to multiple wheels, (b) a differential gear mechanism disposed in the power transmission mechanism and distributing a torque input from the drive power source to the multiple wheels, (c) a casing housing the power transmission mechanism, and (d) an oil pump sucking a lubricating oil stored in the casing and (e) that drives the oil pump in conjunction with rotation of the differential gear mechanism. For example, this corresponds to a vehicle drive device described in Patent Document 1.

CITATION LIST

Patent Document 1: Japanese Laid-Open Patent Publication No. 2013-119918

SUMMARY OF THE INVENTION

Technical Problem

In the vehicle drive device as described in Patent Document 1, the oil pump driven in conjunction with the rotation of the differential gear mechanism sucks the lubricating oil stored in the casing during forward running of the vehicle to discharge the sucked lubricating oil from a discharge port; however, during backward running of the vehicle, a rotor disposed in the oil pump rotates in the opposite direction to that during the forward running, so that the lubricating oil may be exhausted from the inside of the oil pump, which may cause a seizure of the oil pump.

The present invention was conceived in view of the situations and it is therefore an object of the present invention to provide a vehicle drive device which suitably prevents a seizure of an oil pump during backward running of a vehicle.

Solution to Problem

To achieve the above object, a first aspect of the present invention provides a vehicle drive device (a) comprising: a power transmission mechanism transmitting a drive power from a drive power source to a plurality of wheels; a differential gear mechanism provided in the power transmission mechanism and distributing the drive power input from the drive power source to the plurality of wheels; a casing housing the power transmission mechanism; and an oil pump sucking a lubricating oil stored in the casing, the vehicle drive device driving the oil pump in conjunction with rotation of the differential gear mechanism, wherein (b) a catch tank storing the lubricating oil is provided in the casing, wherein (c) an introduction path is formed in the casing for introducing the lubricating oil scooped up by the differential gear mechanism during backward running of a vehicle into the catch tank, and wherein (d) a discharge oil passage connected to a discharge port of the oil pump is connected to the catch tank.

Advantageous Effects of Invention

According to the vehicle drive device recited in the first aspect of the invention, (b) the catch tank storing the lubricating oil is provided in the casing, (c) the introduction path is formed in the casing for introducing the lubricating oil scooped up by the differential gear mechanism during backward running of the vehicle into the catch tank, and (d) the discharge oil passage connected to the discharge port of the oil pump is connected to the catch tank. Therefore, during backward running of the vehicle, the lubricating oil scooped up by the differential gear mechanism is introduced through the introduction path formed in the casing into the catch tank, so that even when the rotor of the oil pump reversely rotates during backward running of the vehicle, the lubricating oil stored in the catch tank is sucked through the discharge oil passage into the oil pump. This makes it possible to avoid the situation in which the oil is exhausted from the inside of the the oil pump even when the rotor of the oil pump reversely rotates during backward running of the vehicle, so that a seizure of the oil pump can suitably be prevented during backward running of the vehicle.

DESCRIPTION OF EMBODIMENTS

A second aspect of the present invention provides the vehicle drive device recited in the first aspect of the invention, wherein (a) the power transmission mechanism is provided with a gear mechanism including a first rotating shaft coupled to the drive power source in a power transmittable manner, a small diameter gear meshed with a ring gear disposed in the differential gear mechanism, a large diameter gear having a diameter larger than the small diameter gear and meshed with a pinion disposed on the first rotating shaft, and a second rotating shaft on which the small diameter gear and the large diameter gear are fixedly disposed, and wherein (b) the introduction path includes a first introduction path for introducing the lubricating oil scooped up by the ring gear of the differential gear mechanism during backward running of the vehicle to the large diameter gear of the gear mechanism, and a second introduction path for introducing the lubricating oil scooped up by the large diameter gear of the gear mechanism into the catch tank. Therefore, during backward running of the vehicle, the lubricating oil scooped up by the ring gear of the differential gear mechanism is suitably introduced into the catch tank through the first introduction path and the second introduction path.

A third aspect of the present invention provides the vehicle drive device recited in the second aspect of the invention, wherein the ring gear of the differential gear mechanism is a helical gear having a plurality of teeth inclined in a rotation direction of the ring gear during backward running of the vehicle from a side surface on the large diameter gear side toward another side surface on the side opposite to the large diameter gear side of the ring gear. Therefore, the lubricating oil scooped up by the ring gear of the differential gear mechanism is directed to the large diameter gear of the gear mechanism, so that the lubricating oil is suitably introduced into the catch tank.

A fourth aspect of the present invention provides the vehicle drive device recited in the second or third aspect of the invention, wherein the casing is provided with a first oil guide member guiding the lubricating oil scooped up by the ring gear of the differential gear mechanism along the first introduction path toward the large diameter gear of the gear mechanism. Therefore, the lubricating oil scooped up by the ring gear of the differential gear mechanism is suitably guided by the first oil guide member toward the large diameter gear of the gear mechanism.

A fifth aspect of the present invention provides the vehicle drive device recited in any one of the second to fourth aspects of the invention, wherein the casing is provided with a second oil guide member guiding the lubricating oil scooped up by the large diameter gear of the gear mechanism along the second introduction path toward the catch tank. Therefore, the lubricating oil scooped up by the large diameter gear of the gear mechanism is suitably guided by the second oil guide member toward the catch tank.

A sixth aspect of the present invention provides the vehicle drive device recited in any one of the second to fifth aspects of the invention, wherein the catch tank includes a first storage portion storing the lubricating oil scooped up by the ring gear of the differential gear mechanism during backward running of the vehicle, a second storage portion storing the lubricating oil scooped up by the ring gear of the differential gear mechanism during forward running of the vehicle, and a connecting portion connecting the first storage portion and the second storage portion. Therefore, the lubricating oil scooped up by the ring gear of the differential gear mechanism is stored in the catch tank not only during forward running of the vehicle but also during backward running of the vehicle.

A seventh aspect of the present invention provides the vehicle drive device recited in any one of the first to sixth aspects of the invention, wherein the catch tank is disposed above the oil pump in the casing. Therefore, during backward running of the vehicle, the lubricating oil stored in the catch tank is suitably sucked into the oil pump via the discharge oil passage.

An example of the present invention will be described in detail with reference to the drawings. In the following example, the figures are simplified or deformed as appropriate and portions are not necessarily precisely drawn in terms of dimension ratio, shape, etc.

FIRST EXAMPLE

Figure 1:
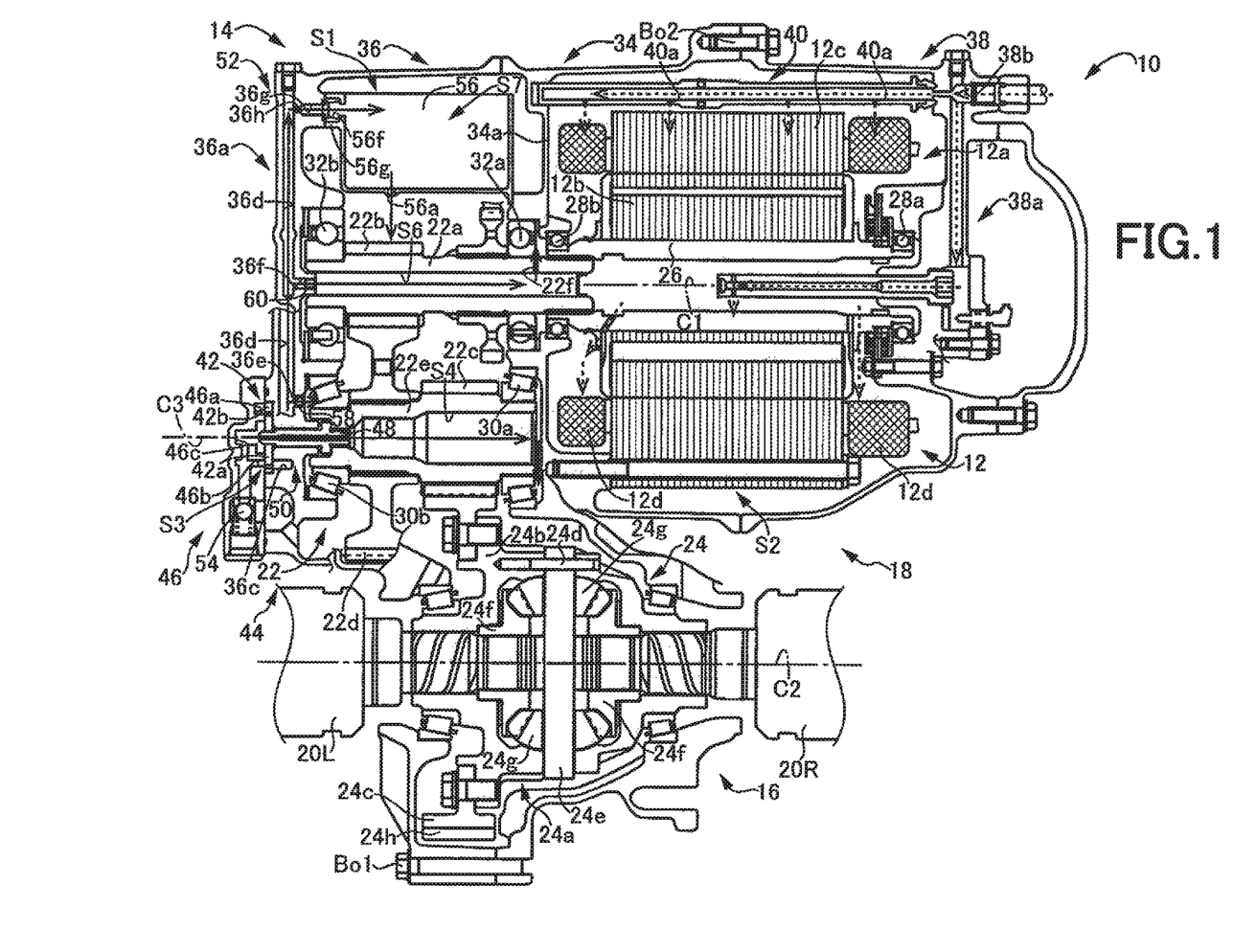
FIG. 1 is a cross-sectional view for schematically explaining a configuration of a drive device of an electric vehicle to which the present invention is suitably applied.

FIG. 1 is a cross-sectional view for explaining a configuration of an electric vehicle 10 to which the present invention is suitably applied. The electric vehicle 10 includes a drive device (vehicle drive device) 14 driving a pair of right and left drive wheels (multiple wheels) not shown by an electric motor 12 that is a drive power source for running. As shown in FIG. 1, the drive device 14 includes an electric motor 12, a power transmission mechanism 16 transmitting a drive power from the electric motor 12 to the pair of right and left drive wheels or transmitting a drive power from the pair of right and left drive wheels to the electric motor 12, a housing (casing) 18 housing the electric motor 12, the power transmission mechanism 16 etc., and drive shafts 20L, 20R rotating together with the pair of right and left drive wheels. The power transmission mechanism 16 includes a gear mechanism 22 coupled to the electric motor 12 in a power transmittable manner and a differential device (differential gear mechanism) 24 coupled to the gear mechanism 22 in a power transmittable manner.

As shown in FIG. 1, the electric motor 12 includes, for example, a cylindrical stator 12a fixed to the housing 18 and a cylindrical rotor 12b fixed to a rotor shaft 26, such that the outer surface of the rotor 12b is apart from the inner surface of the cylindrical stator 12a by a predetermined gap. The cylindrical rotor shaft 26 penetrating through and integrally fixed to the cylindrical rotor 12b is rotatably supported around a first rotation axis C1 by the housing 18 via a pair of first bearings 28a, 28b. The stator 12a includes coil ends 12d wound around a cylindrical stator core 12c on both sides of the stator core 12c in the direction of the first rotation axis C1.

As shown in FIG. 1, the differential device 24 includes a container-shaped differential casing 24a rotatably supported around a second rotation axis C2, a differential ring gear (ring gear) 24c fixed to an outer circumferential portion 24b of the differential casing 24a, a columnar pinion shaft 24e having both end portions supported by the differential casing 24a and fixed to the differential casing 24a by a knock pin 24d in a posture orthogonal to the second rotation axis C2, a pair of side gears 24f rotatably arranged around the second rotation axis C2 in a facing state across the pinion shaft 24e and housed in the differential casing 24a, and a pair of pinions 24g meshing with the pair of side gears 24f and rotating together with the differential casing 24a while the pinion shaft 24e is inserted through the pair of pinions 24g such that the pair of pinions 24g are rotatably supported by the pinion shaft 24e. When a torque (drive power) from the electric motor 12 is input via the gear mechanism 22 to the differential ring gear 24c, the differential device 24 configured as described above distributes the input torque input from the electric motor 12 to the pair of left and right drive wheels while allowing differential rotation of the pair of side gears 24f rotating together with the pair of left and right drive shafts 20L, 20R.

Figure 2:
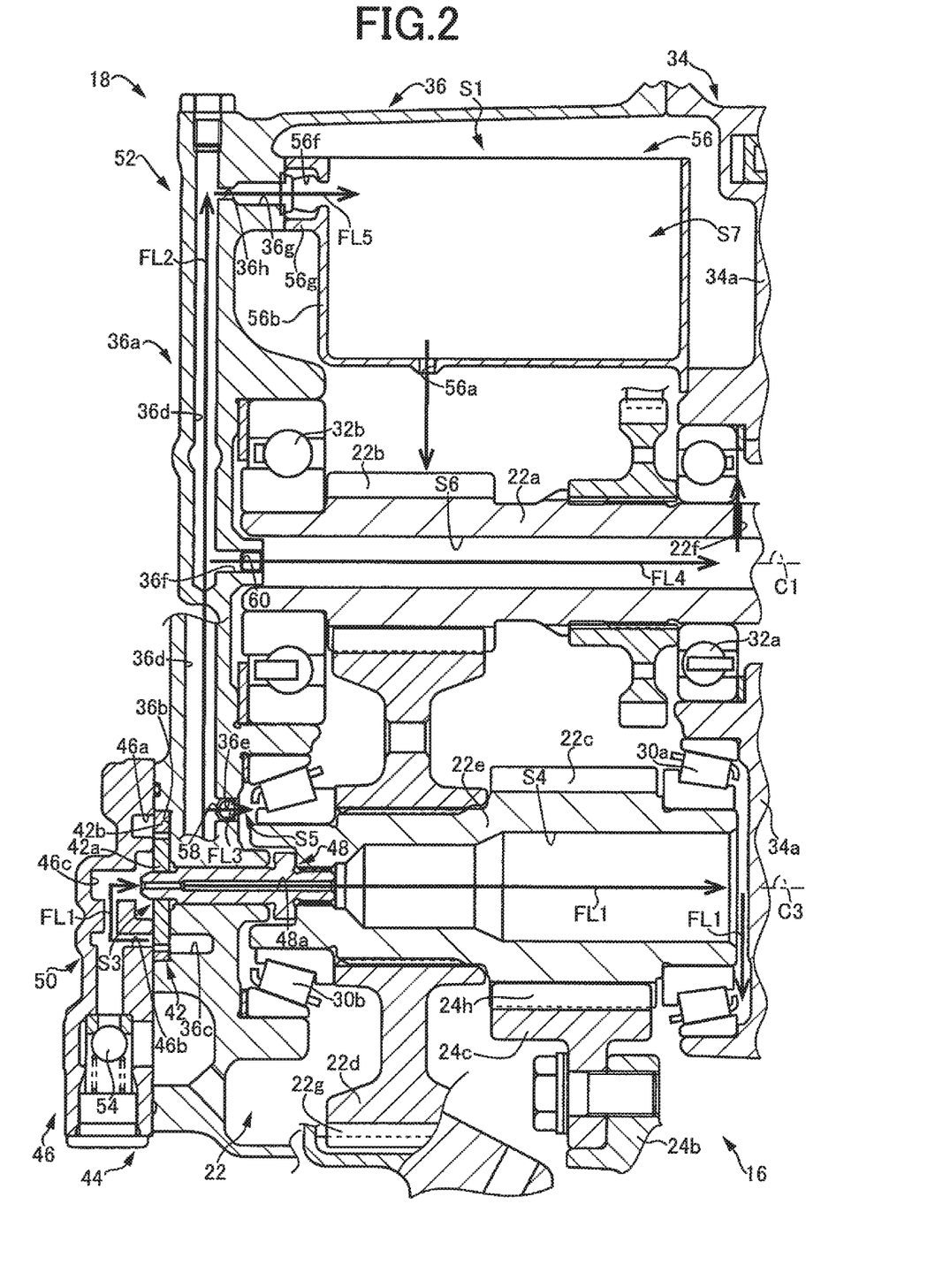
FIG. 2 is an enlarged view of FIG. 1 showing in detail a lubricating path provided in the drive device of FIG. 1 and is a diagram for explaining a flow of oil discharged from a mechanical oil pump disposed in the lubricating path.

As shown in FIGS. 1 and 2, the gear mechanism 22 includes a cylindrical first rotating shaft 22*a* coupled to the rotor shaft 26, which is disposed in the electric motor 12, in a power transmittable manner, a pinion 22*b* formed integrally with the first rotating shaft 22*a*, a small diameter gear 22*c* meshed with the differential ring gear 24*c* disposed in the differential device 24, a large diameter gear 22*d* having a diameter larger than the small diameter gear 22*c* and meshed with the pinion 22*b* formed on the first rotating shaft 22*a*, and a cylindrical second rotating shaft 22*e* to which the small diameter gear 22*c* and the large diameter gear 22*d* are integrally fixed. In the gear mechanism 22, the second rotating shaft 22*e* is rotatably supported around a third rotation axis C3 by the housing 18 via a pair of second bearings 30*a*, 30*b* respectively disposed at both end portions of the second rotating shaft 22*e*. The first rotating shaft 22*a* is rotatably supported around the first rotation axis C1 by the housing 18 via a pair of third bearings 32*a*, 32*b* respectively disposed at both end portions of the first rotating shaft 22*a*, i.e., rotatably supported around the same rotation axis C1 as the rotor shaft 26 disposed in the electric motor 12.

Figure 3:
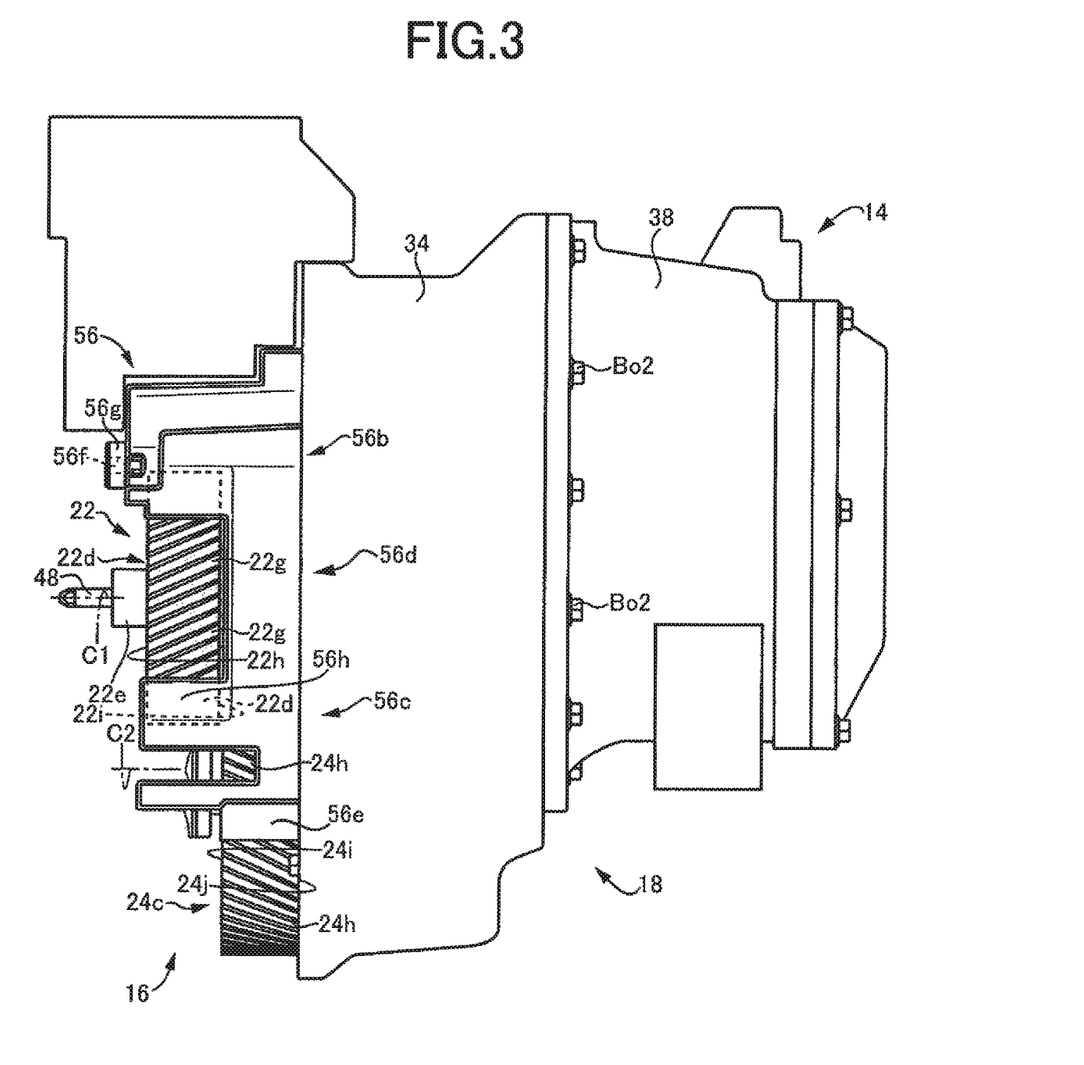
FIG. 3 is a view when a second casing member of a housing is removed from the drive device.

As shown in FIGS. 1 to 3, the housing 18 includes a first casing member 34, a second casing member 36 integrally fixed to the first casing member 34 by a first fastening bolt Bo1 (see FIG. 1), and a third casing member 38 integrally fixed to the first casing member 34 by a second fastening bolt Bo2 (see FIGS. 1 and 3). The housing 18 is provided to have a first housing space S1 formed by the first casing member 34 and the second casing member 36, and a second housing space S2 formed by the first casing member 34 and the third casing member 38, and the first housing space S1 houses the power transmission mechanism 16 etc., i.e., the gear mechanism 22, the differential device 24, etc., and second housing space S2 houses the electric motor 12 etc. The first casing member 34 is provided with a partition wall 34*a* separating the first housing space S1 and the second housing space S2, the second casing member 36 is provided with a wall portion 36*a* facing the partition wall 34*a* formed in the first casing member 34, and the third casing member 38 is provided with a wall portion 38*a* facing the partition wall 34*a* formed in the first casing member 34. FIG. 3 is a view when the second casing member 36 of the housing 18 is removed from the drive device 14.

As shown in FIG. 1, a tubular cooling pipe 40 discharging an oil from discharge holes 40*a* to cool the electric motor 12 is disposed vertically above the electric motor 12 in the housing 18, i.e., in the second housing space S2. The wall portion 38*a* of the third casing member 38 is provided with an oil flow passage 38*b* into which the oil discharged from an electric oil pump (not shown) via an oil cooler (not shown) flows, and the oil flowing into the oil flow passage 38*b* is introduced into the cooling pipe 40.

As shown in FIGS. 1 and 2, the drive device 14 is provided with a lubricating path 44 having a mechanical oil pump (oil pump) 42, sucking an oil (lubricating oil) stored in the housing 18 by the mechanical oil pump 42, and supplying the sucked oil to the power transmission mechanism 16 etc. to lubricate the power transmission mechanism 16 etc.

The mechanical oil pump 42 is an internal gear type oil pump. As shown in FIG. 2, the mechanical oil pump 42 includes a pump chamber S3 formed by the wall portion 36*a* of the second casing member 36 and a pump cover 46 attached to the wall portion 36*a* of the second casing member 36, an annular inner rotor 42*a* having multiple outer circumferential teeth and rotatably supported around the third rotation axis C3 by a pump drive shaft 48 coupled to the second rotating shaft 22*e*, and an annular outer rotor 42*b* having multiple inner circumferential teeth meshed with the outer circumferential teeth of the inner rotor 42*a* and rotatably supported around a rotation axis eccentric from the third rotation axis C3 by a recess portion 36*b* formed in the wall portion 36*a* of the second casing member 36. The inner rotor 42*a* and the outer rotor 42*b* are housed in the pump chamber S3, and the inner rotor 42*a* is relatively non-rotatably coupled to the pump drive shaft 48.

As shown in FIG. 2, the mechanical oil pump 42 includes a suction port 46*a* formed in a sliding surface of the pump cover 46 for the inner rotor 42*a* and the outer rotor 42*b* and connected to a suction oil passage (not shown) for sucking the oil (see FIGS. 5 and 6) stored in a storage space S1*a* of the housing 18, a first discharge port 46*b* formed in the sliding surface of the pump cover 46 for the inner rotor 42*a* and the outer rotor 42*b*, and a second discharge port (discharge port) 36*c* formed in a sliding surface for the inner rotor 42*a* and the outer rotor 42*b* in the recess portion 36*b* formed in the wall portion 36*a* of the second casing member 36.

Figure 5:
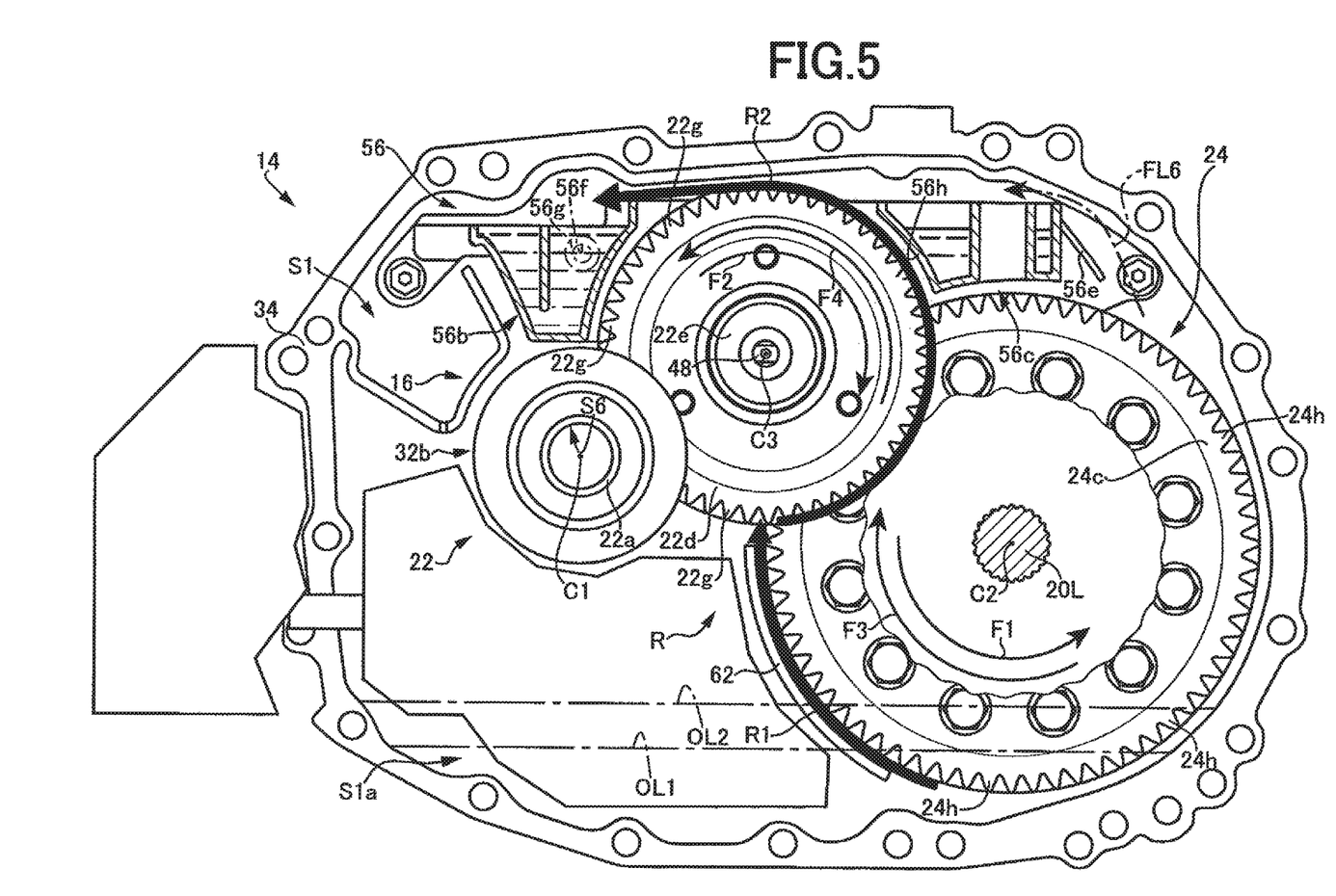
FIG. 5 is a view of FIG. 4 as viewed in a direction of an arrow A1.
Figure 6:
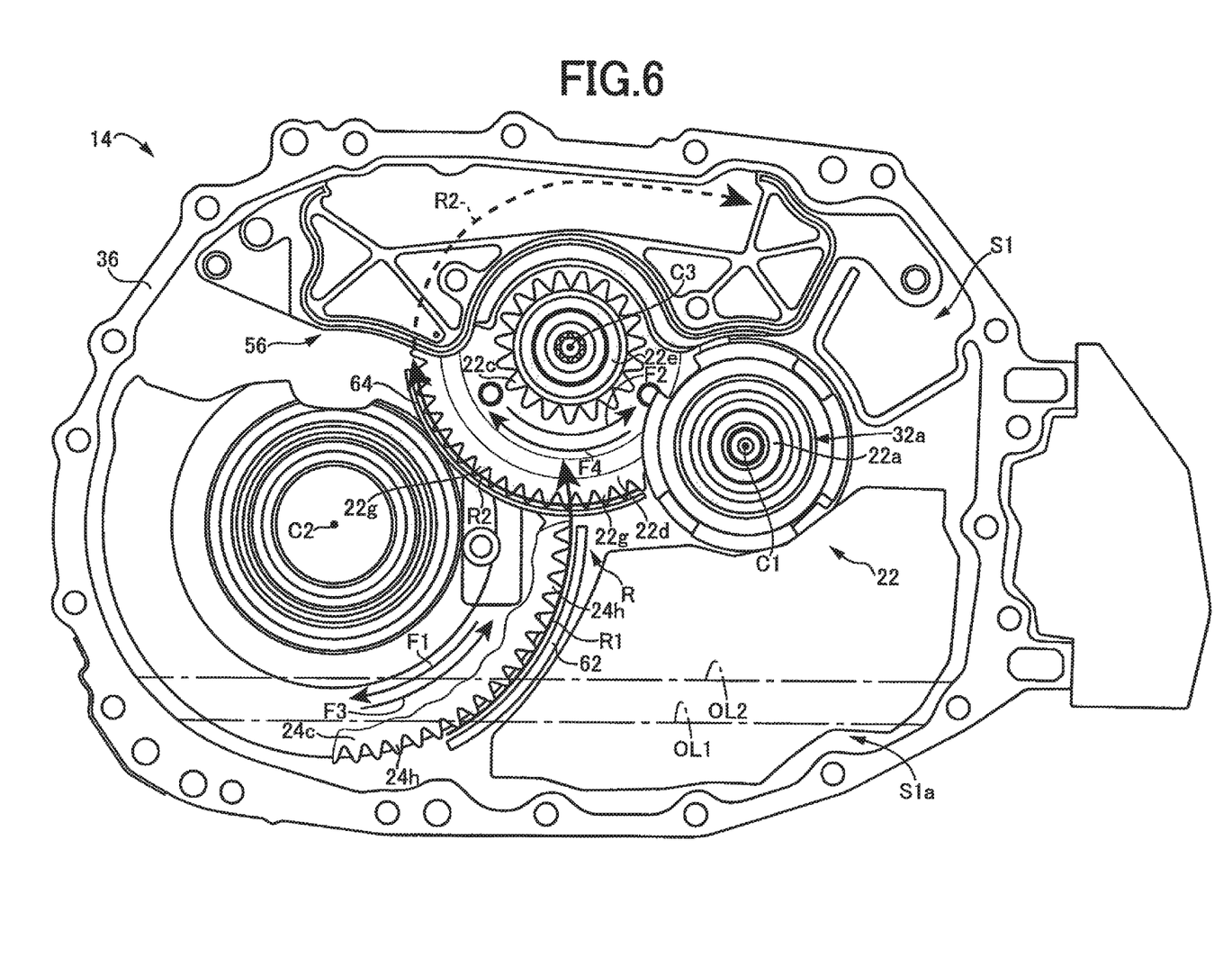
FIG. 6 is a view of the drive device of FIG. 4 with the second casing member attached thereto as viewed in a direction of an arrow B.

In the mechanical oil pump 42, when the differential ring gear 24*c* of the differential device 24 rotates in a direction of an arrow F1 (see FIGS. 5 and 6) around the second rotation axis C2 during forward running of the vehicle 10, and the inner rotor 42*a* coupled to the second rotating shaft 22*e* of the gear mechanism 22, i.e., the pump drive shaft 48, is rotationally driven in a direction of an arrow F2 (see FIGS. 5 and 6) around the third rotation axis C3, the oil stored in the storage space S1*a* of the housing 18 is sucked and taken into any one of multiple spaces, which are partitioned and formed by the inner circumferential teeth of the outer rotor 42*b* and the outer circumferential teeth of the inner rotor 42*a*, from the suction port 46*a*. The oil taken into the space is compressed by being carried to a circumferential position at which the volume of the space decreases as the inner rotor 42*a* rotates, and the oil increased in pressure by the compression is discharged from the first discharge port 46*b* and the second discharge port 36*c*. The mechanical oil pump 42 does not have, for example, a one-way clutch preventing reverse rotation of the mechanical oil pump 42, i.e., reverse rotation of the inner rotor 42*a* i.e. a rotation in the direction (direction of an arrow F4) opposite to the rotation in the direction of the arrow F2 around the third rotation axis C3, and the mechanical oil pump 42 is an oil pump having the inner rotor 42*a* always rotated in conjunction with the rotation of the differential ring gear 24*c* of the differential device 24 so that the mechanical oil pump 42 is driven. In FIGS. 5 and 6, a first oil level OL1 indicated by a dashed-dotted line is a line indicative of an oil level of the oil stored in the storage space S1*a* of the housing 18 during forward or backward running of the vehicle 10, and a second oil level OL2 indicated by a dashed-two dotted line is a line indicative of an oil level of the oil stored in the storage space S1*a* of the housing 18 during stop of the vehicle 10.

As shown in FIG. 2, the lubricating path 44 is provided with a first supply oil passage 50 supplying a portion of the oil discharged from the mechanical oil pump 42 to the second bearing 30*a*, for example, and a second supply oil passage 52 supplying another portion of the oil discharged from the mechanical oil pump 42 to the gear mechanism 22, the second bearing 30*b*, and the third bearing 32*a*, for example.

As shown in FIG. 2, the first supply oil passage 50 includes an axial oil passage 48*a* formed in the pump drive shaft 48, an oil providing passage 46*c* formed in the pump cover 46 for supplying the oil discharged from the first discharge port 46b to the axial oil passage 48a of the pump drive shaft 48, and an internal space S4 of the cylindrical second rotating shaft 22e communicating with the axial oil passage 48a of the pump drive shaft 48. When the oil is discharged by the mechanical oil pump 42 from the first discharge port 46b, the first supply oil passage 50 configured as described above supplies the oil discharged from the mechanical oil pump 42 to the second bearing 30a as indicated by arrows FL1 shown in FIG. 2. The arrows FL1 are arrows indicative of a flow of the oil discharged by the mechanical oil pump 42 from the first discharge port 46b. The pump cover 46 is provided with a relief valve 54 for discharging a portion of the oil discharged from the first discharge port 46b by the mechanical oil pump 42, for example, if a discharge amount of the oil discharged to the oil providing passage 46c by the mechanical oil pump 42 becomes excessive or if the oil pressure becomes abnormally high due to clogging of an oil passage etc.

As shown in FIG. 2, the second supply oil passage 52 includes a discharge oil passage 36d formed in the wall portion 36a of the second casing member 36 along the wall portion 36a and connected to the second discharge port 36c, a first branch oil passage 36e branched from the discharge oil passage 36d and communicating with a space S5 around the second bearing 30b in the first housing space S1, a second branch oil passage 36f branched from the discharge oil passage 36d and communicating with an internal space S6 of the cylindrical first rotating shaft 22a, and a third branch oil passage 36g branched from the discharge oil passage 36d and supplying a portion of the oil discharged from the mechanical oil pump 42 to a catch tank 56. As shown in FIG. 2, the second supply oil passage 52 includes the internal space S6 of the first rotating shaft 22a, a radial oil passage 22f formed in the first rotating shaft 22a, a storage space S7 of the catch tank 56, and a discharge port 56a formed in the catch tank 56. The first branch oil passage 36e, the second branch oil passage 36f, and the third branch oil passage 36g are provided with respective orifices 58, 60, 36h.

In the second supply oil passage 52 configured as described above, when the oil is discharged by the mechanical oil pump 42 from the second discharge port 36c, the oil discharged from the mechanical oil pump 42 is supplied to the discharge oil passage 36d as indicated by an arrow FL2 shown in FIG. 2. For example, a portion of the oil supplied to the discharge oil passage 36d is supplied through the first branch oil passage 36e to the second bearing 30b as indicated by an arrow FL3 shown in FIG. 2. For example, a portion of the oil supplied to the discharge oil passage 36d is supplied through the second branch oil passage 36f to the internal space S6 of the first rotating shaft 22a as indicated by an arrow FL4 shown in FIG. 2, and the oil supplied to the internal space S6 of the first rotating shaft 22a is ejected to the third bearing 32a in accordance with a centrifugal force from the radial oil passage 22f formed in the first rotating shaft 22a. For example, a portion of the oil supplied to the discharge oil passage 36d passes through the third branch oil passage 36g and is stored in the catch tank 56 as indicated by an arrow FL5 shown in FIG. 2, and the oil stored in the catch tank 56 is ejected from the discharge port 56a formed in the catch tank 56 to the pinion 22b formed on the first rotating shaft 22a. The arrows FL2 to FL5 are arrows indicative of a flow of the oil discharged by the mechanical oil pump 42 from the second discharge port 36c.

Figure 4:
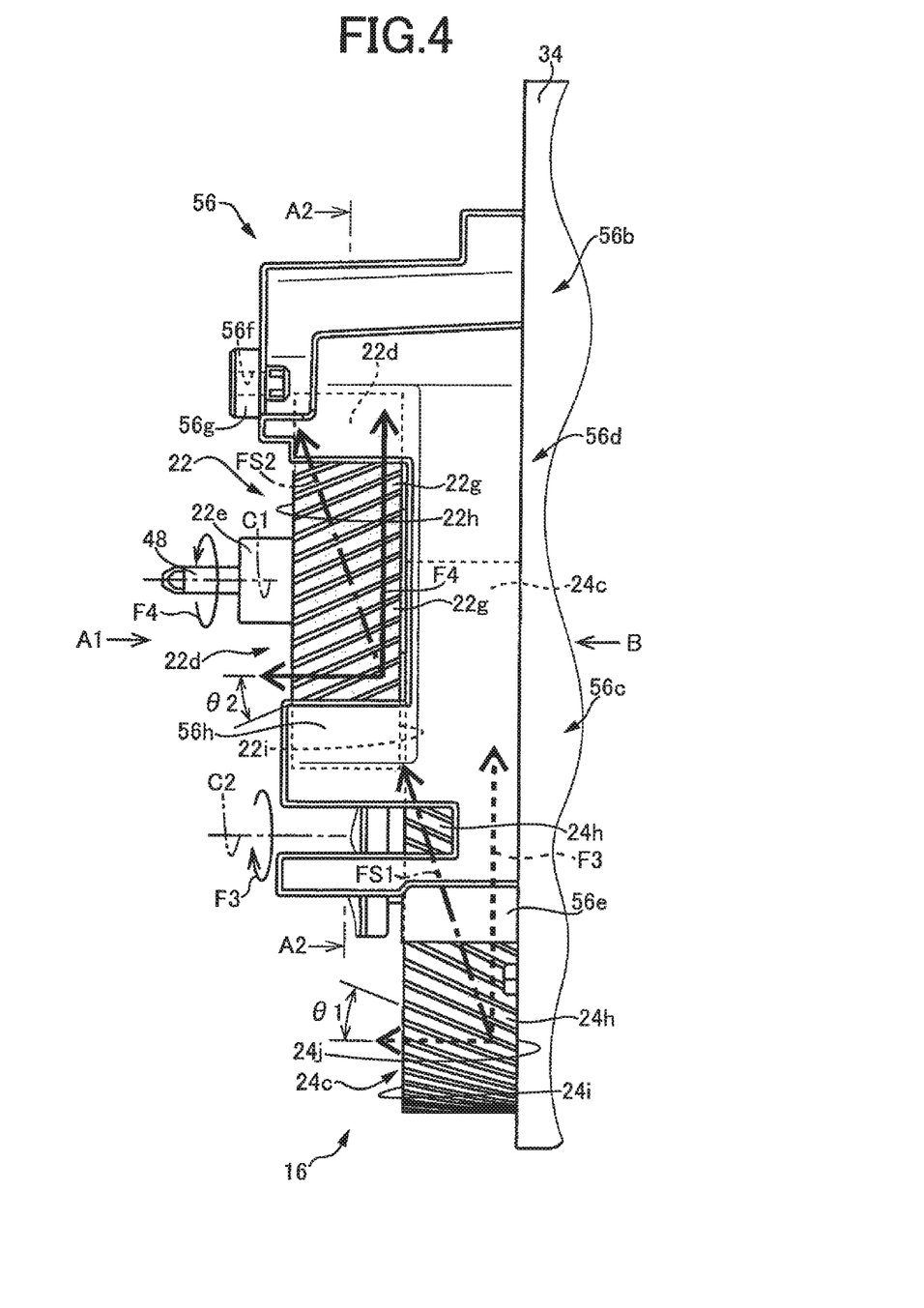
FIG. 4 is an enlarged view of FIG. 3 showing a peripheral portion of a catch tank disposed in the drive device of FIG. 3.

As shown in FIGS. 3 and 4, the catch tank 56 includes a first storage portion 56b storing the oil scooped up (splashed up) by the differential ring gear 24c of the differential device 24 rotating in a direction of an arrow F3 (see FIGS. 5 and 6) around the second rotation axis C2 during backward running of the vehicle 10, a second storage portion 56c storing the oil scooped up by the differential ring gear 24c of the differential device 24 rotating in the direction of the arrow F1 (see FIGS. 5 and 6) around the second rotation axis C2 during forward running of the vehicle 10, and a connecting portion 56d connecting the first storage portion 56b and the second storage portion 56c. The oil scooped up by the differential ring gear 24c rotating in the direction of the arrow F3 around the second rotation axis C2 is introduced into the first storage portion 56b of the catch tank 56 through an introduction path R (see FIGS. 5 and 6) formed in the housing 18. As shown in FIG. 5, the oil scooped up by the differential ring gear 24c rotating in the direction of the arrow F1 around the second rotation axis C2 is guided to the second storage portion 56c of the catch tank 56 through a band plate-shaped oil guide plate 56e fixedly disposed on the catch tank 56. In FIG. 5, an arrow FL6 indicated by a dashed-dotted line is an arrow indicative of a flow of the oil scooped up by the differential ring gear 24c rotating in the direction of the arrow F1 around the second rotation axis C2. FIG. 4 is an enlarged view of FIG. 3 showing a peripheral portion of the catch tank 56 disposed in the drive device 14 shown in FIG. 3. FIG. 5 is a view of FIG. 4 as viewed in a direction of an arrow A1, and the cross section of the catch tank 56 shown in FIG. 5 is a cross section taken along a line A2-A2 of FIG. 4. FIG. 6 is a view of the drive device 14 of FIG. 4 with the second casing member 36 attached thereto as viewed in a direction of an arrow B.

As shown in FIGS. 2 and 4, a cylindrically-shaped cylindrical portion 56g is fixedly provided in the first storage portion 56b of the catch tank 56 and is provided with a communication hole 56f communicating with the third branch oil passage 36g formed in the wall portion 36a of the second casing member 36 and the storage space S7 of the catch tank 56. The catch tank 56 is disposed vertically above the mechanical oil pump 42 such that the communication hole 56f of the cylindrical portion 56g disposed in the catch tank 56 in the first housing space S1 of the housing 18 is located vertically above the second discharge port 36c provided in the mechanical oil pump 42. As shown in FIG. 5, when the oil scooped up due to the rotation of the differential ring gear 24c of the differential device 24 during forward running or backward running of the vehicle is stored in the catch tank 56, the communication hole 56f formed in the cylindrical portion 56g is filled with the oil stored in the catch tank 56. In the catch tank 56, the connecting portion 56d provided in the catch tank 56 allows circulation of the oil stored in the first storage portion 56b and the oil stored in the second storage portion 56c.

As shown in FIGS. 5 and 6, the introduction path R has a first introduction path R1 for introducing the oil (lubricating oil) scooped up by the differential ring gear 24c of the differential device 24 rotating in the direction of the arrow F3 around the second rotation axis C2 during backward running of the vehicle to the large diameter gear 22d of the gear mechanism 22 and a second introduction path R2 for introducing the oil scooped up by the large diameter gear 22d of the gear mechanism 22 rotating in the direction of the arrow F4 around the third rotation axis C3 during backward running of the vehicle into the catch tank 56.

In the housing 18, as shown in FIGS. 5 and 6, a first oil guide member 62 is fixedly disposed for guiding the oil scooped up by the differential ring gear 24c of the differential device 24 rotating in the direction of the arrow F3 around the second rotation axis C2 during backward running of the vehicle along the first introduction path R1 toward the large diameter gear 22d of the gear mechanism 22, and the first oil guide member 62 is disposed in the housing 18 so that the first introduction path R1 is formed in the housing 18. The first oil guide member 62 is a band plate-shaped member bent into a circular arc shape along the first introduction path R1.

As shown in FIG. 4, the differential ring gear 24c of the differential device 24 is a helical gear with a helical angle θ1 having multiple outer circumferential teeth (teeth) 24h of the differential ring gear 24c inclined in the rotation direction of the differential ring gear 24c during backward running of the vehicle, i.e., in the direction of the arrow F3, from a side surface 24i of the differential ring gear 24c on the large diameter gear 22d side toward a side surface 24j of the differential ring gear 24c on the side opposite to the large diameter gear 22d side. Therefore, as shown in FIG. 4, when the differential ring gear 24c rotates in the direction of the arrow F3 around the second rotation axis C2 during backward running of the vehicle, the oil scooped up due to the rotation of the differential ring gear 24c splashes toward the large diameter gear 22d of the gear mechanism 22. In FIG. 4, an arrow FS1 indicated by a dashed-dotted line is an arrow indicative of a splashing direction of the oil splashed by the rotation of the differential ring gear 24c during backward running of the vehicle.

In the housing 18, as shown in FIGS. 5 and 6, a second oil guide member 64 is disposed for guiding the oil scooped up by the large diameter gear 22d of the gear mechanism 22 rotating in the direction of the arrow F4 around the third rotation axis C3 during backward running of the vehicle along the second introduction path R2 toward the first storage portion 56b of the catch tank 56, and the second storage portion 56c of the catch tank 56 has an oil guide portion 56h formed such that the oil guided by the second oil guide member 64 due to the rotation of the large diameter gear 22d during backward running of the vehicle is guided toward the first storage portion 56b of the catch tank 56. Therefore, the second oil guide member 64 is disposed in the housing 18, and the oil guide portion 56h is formed in the second storage portion 56c of the catch tank 56, so that the second introduction path R2 is formed in the housing 18. The second oil guide member 64 is a band plate-shaped member bent in a circular arc shape along the second introduction path R2, and the oil guide portion 56h is a portion of the second storage portion 56c of the catch tank 56 bent into a circular arc shape along the second introduction path R2.

As shown in FIG. 4, the large diameter gear 22d of the gear mechanism 22 is a helical gear with a helical angle θ2 having multiple outer circumferential teeth 22g of the large diameter gear 22d inclined in the rotation direction of the large diameter gear 22d during backward running of the vehicle, i.e., in the direction of the arrow F4, from a side surface 22h of the large diameter gear 22d on the side opposite to the differential ring gear 24c side toward a side surface 22i of the large diameter gear 22d on the differential ring gear 24c side. Therefore, as shown in FIG. 4, when the large diameter gear 22d rotates in the direction of the arrow F4 around the third rotation axis C3 during backward running of the vehicle, the oil scooped up due to the rotation of the large diameter gear 22d splashes toward the cylindrical portion 56g provided in the first storage portion 56b of the catch tank 56, and the oil scooped up due to the rotation of the large diameter gear 22d is introduced into the first storage portion 56b of the catch tank 56. In FIG. 4, an arrow FS2 indicated by a dashed-dotted line is an arrow indicative of a splashing direction of the oil splashed by the rotation of the large diameter gear 22d during backward running of the vehicle.

In the drive device 14 configured as described above, when the differential ring gear 24c of the differential device 24 rotates in the direction of the arrow F1 around the second rotation axis C2 during forward running of the vehicle, and the inner rotor 42a thereby rotates in the direction of the arrow F2 around the third rotation axis C3 so that the mechanical oil pump 42 is driven, the oil stored in the storage space S1a of the housing 18 is sucked by the mechanical oil pump 42, and the sucked oil is discharged by the mechanical oil pump 42 from the first discharge port 46b and the second discharge port 36c. As a result, as shown in FIG. 2, the oil discharged from the mechanical oil pump 42 is supplied to the power transmission mechanism 16, for example, the second bearings 30a, 30b, the third bearing 32a, and the pinion 22b of the first rotating shaft 22a, etc. and lubricates the power transmission mechanism 16.

Figure 7:
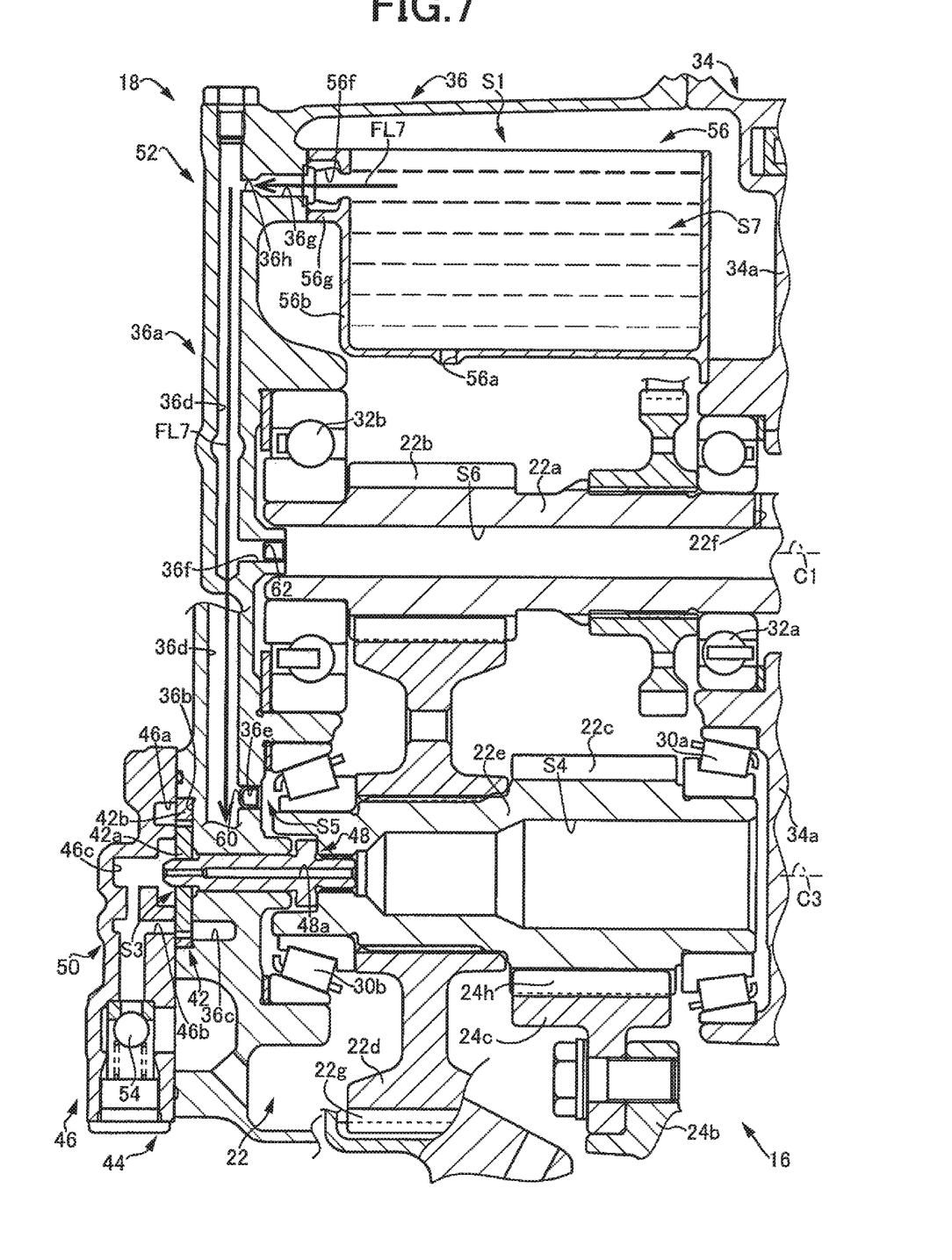
FIG. 7 is an enlarged view of FIG. 1 showing in detail the lubricating path provided in the drive device of FIG. 1 and is a view for explaining a flow of oil when an inner rotor of the mechanical oil pump reversely rotates during backward running of a vehicle.

In the drive device 14, when the differential ring gear 24c of the differential device 24 rotates in the direction of the arrow F3 around the second rotation axis C2 during backward running of the vehicle, and the inner rotor 42a thereby reversely rotates in the direction of the arrow F4 around the third rotation axis C3, the oil scooped up by the differential ring gear 24c is introduced into the catch tank 56 through the introduction path R formed in the housing 18 as shown in FIGS. 5 and 6, and the oil scooped up by the differential ring gear 24c is continuously stored in the catch tank 56 during backward running of the vehicle. Therefore, even when the inner rotor 42a of the mechanical oil pump 42 reversely rotates in the direction of the arrow F4 around the third rotation axis C3 during backward running of the vehicle, the oil stored in the catch tank 56 is continuously sucked through the discharge oil passage 36d into the mechanical oil pump 42 as shown in FIG. 7. An arrow FL7 is an arrow indicative of a flow of the oil sucked by the mechanical oil pump 42 when the inner rotor 42a of the mechanical oil pump 42 reversely rotates in the direction of the arrow F4 around the third rotation axis C3 during backward running of the vehicle.

As described above, according to the drive device 14 of this example, the catch tank 56 storing an oil is disposed in the housing 18, the introduction path R is formed in the housing 18 for introducing the oil scooped up by the differential ring gear 24c of the differential device 24 during backward running of the vehicle into the catch tank 56, and the discharge oil passage 36d connected to the second discharge port 36c of the mechanical oil pump 42 is connected to the catch tank 56. Therefore, during backward running of the vehicle, the oil scooped up by the differential ring gear 24c of the differential device 24 is introduced through the introduction path R formed in the housing 18 into the catch tank 56, so that even when the inner rotor 42a of the mechanical oil pump 42 reversely rotates during backward running of the vehicle, the oil stored in the catch tank 56 is sucked through the discharge oil passage 36d into the mechanical oil pump 42. This makes it possible to avoid the situation in which the oil is exhausted from the inside of the mechanical oil pump 42 even when the inner rotor 42a of the mechanical oil pump 42 reversely rotates during backward running of the vehicle, so that a seizure of the mechanical oil pump 42 can suitably be prevented during backward running of the vehicle.

According to the drive device 14 of this example, the power transmission mechanism 16 is provided with the gear mechanism 22 including the first rotating shaft 22a coupled to the electric motor 12 in a power transmittable manner, the small diameter gear 22c meshed with the differential ring gear 24c provided in the differential device 24, the large diameter gear 22d having a diameter larger than the small diameter gear 22c and meshed with the pinion 22b disposed on the first rotating shaft 22a, and the second rotating shaft 22e on which the small diameter gear 22c and the large diameter gear 22d are fixedly disposed, and the introduction path R includes the first introduction path R1 for introducing the oil scooped up by the differential ring gear 24c of the differential device 24 during backward running of the vehicle to the large diameter gear 22d of the gear mechanism 22, and the second introduction path R2 for introducing the oil scooped up by the large diameter gear 22d of the gear mechanism 22 into the catch tank 56. Therefore, during backward running of the vehicle, the oil scooped up by the differential ring gear 24c of the differential device 24 is suitably introduced into the catch tank 56 through the first introduction path R1 and the second introduction path R2.

According to the drive device 14 of this example, the differential ring gear 24c of the differential device 24 is a helical gear having the multiple outer circumferential teeth 24h of the differential ring gear 24c inclined in the rotation direction of the differential ring gear 24c during backward running of the vehicle from the side surface 24i of the differential ring gear 24c on the large diameter gear 22d side toward the side surface 24j of the differential ring gear 24c on the side opposite to the large diameter gear 22d side. Therefore, the oil scooped up by the differential ring gear 24c of the differential device 24 is directed to the large diameter gear 22d of the gear mechanism 22, so that the oil scooped up by the differential ring gear 24c is suitably introduced into the catch tank 56.

According to the drive device 14 of this example, the housing 18 is provided with the first oil guide member 62 guiding the oil scooped up by the differential ring gear 24c of the differential device 24 along the first introduction path R1 toward the large diameter gear 22d of the gear mechanism 22. Therefore, the oil scooped up by the differential ring gear 24c of the differential device 24 is suitably guided by the first oil guide member 62 toward the large diameter gear 22d of the gear mechanism 22.

According to the drive device 14 of this example, the housing 18 is provided with the second oil guide member 64 guiding the oil scooped up by the large diameter gear 22d of the gear mechanism 22 along the second introduction path R2 toward the first storage portion 56b of the catch tank 56 by using the oil guide portion 56h formed in the housing 18. Therefore, the oil scooped up by the large diameter gear 22d of the gear mechanism 22 is suitably guided by the second oil guide member 64 toward the catch tank 56.

According to the drive device 14 of this example, the catch tank 56 includes the first storage portion 56b storing the oil scooped up by the differential ring gear 24c of the differential device 24 during backward running of the vehicle, the second storage portion 56c storing the oil scooped up by the differential ring gear 24c of the differential device 24 during forward running of the vehicle, and the connecting portion 56d connecting the first storage portion 56b and the second storage portion 56c. Therefore, the oil scooped up by the differential ring gear 24c of the differential device 24 is stored in the catch tank 56 not only during forward running of the vehicle but also during backward running of the vehicle.

According to the drive device 14 of this example, the catch tank 56 is disposed vertically above the mechanical oil pump 42 in the housing 18. Therefore, during backward running of the vehicle, the oil stored in the catch tank 56 is suitably sucked into the mechanical oil pump 42 via the discharge oil passage 36d.

Although the example of the present invention has been described with reference to the drawings, the present invention is also applied in other forms.

For example, although the drive device 14 is applied to the electric vehicle 10 using the electric motor 12 as the drive power source in the first example, the drive device 14 may be applied to a hybrid vehicle using an electric motor and an engine as drive power sources, for example.

Although the mechanical oil pump 42 is an internal gear type oil pump in the drive device 14 of the example, the mechanical oil pump 42 may be an external gear type oil pump or a vane type oil pump, for example, and an oil pump of any type may be used as long as the oil pump is driven by rotating a rotor thereof always in conjunction with the rotation of the differential ring gear 24c of the differential device 24.

In the drive device 14 of the example, the catch tank 56 is disposed vertically above the mechanical oil pump 42 such that the communication hole 56f of the cylindrical portion 56g provided in the catch tank 56 is located vertically above the second discharge port 36c provided in the mechanical oil pump 42; however, the catch tank 56 may be disposed vertically below the mechanical oil pump 42, for example. Specifically, when the inner rotor 42a reversely rotates during backward running of the vehicle, a pressure is reduced in the discharge oil passage 36d connected to the second discharge port 36c of the mechanical oil pump 42, and therefore, even if the catch tank 56 is disposed vertically below the mechanical oil pump 42, the oil stored in the catch tank 56 is sucked into the mechanical oil pump 42 as long as the communication hole 56f formed in the catch tank 56 is filled with the oil.

The above description is merely an embodiment, and the present invention can be implemented in variously modified and improved forms based on the knowledge of those skilled in the art.

REFERENCE SIGNS LIST

12: electric motor (drive power source)
14: drive device (vehicle drive device)
16: power transmission mechanism
18: housing (casing)
22: gear mechanism
22a: first rotating shaft
22b: pinion
22c: small diameter gear
22d: large diameter gear
22e: second rotating shaft
24: differential device (differential gear mechanism)
24c: differential ring gear (ring gear)
24h: outer circumferential teeth
24i, 24j: side surface
36c: second discharge port (discharge port)
36d: discharge oil passage
42: mechanical oil pump (oil pump)
56: catch tank
56b: first storage portion
56c: second storage portion
56d: connecting portion
62: first oil guide member
64: second oil guide member
R: introduction path
R1: first introduction path
R2: second introduction path

What is claimed is:

1. A vehicle drive device comprising: a power transmission mechanism transmitting a drive power from a drive power source to a plurality of wheels; a differential gear mechanism provided in the power transmission mechanism and distributing the drive power input from the drive power source to the plurality of wheels; a casing housing the power transmission mechanism; and an oil pump sucking a lubricating oil stored in the casing, the vehicle drive device driving the oil pump in conjunction with rotation of the differential gear mechanism, wherein
   a catch tank storing the lubricating oil is provided in the casing, wherein
   an introduction path is formed in the casing for introducing the lubricating oil scooped up by the differential gear mechanism during backward running of a vehicle into the catch tank, and wherein
   a discharge oil passage connected to a discharge port of the oil pump is connected to the catch tank.

2. The vehicle drive device according to claim 1, wherein
   the power transmission mechanism is provided with a gear mechanism including a first rotating shaft coupled to the drive power source in a power transmittable manner, a small diameter gear meshed with a ring gear disposed in the differential gear mechanism, a large diameter gear having a diameter larger than the small diameter gear and meshed with a pinion disposed on the first rotating shaft, and a second rotating shaft on which the small diameter gear and the large diameter gear are fixedly disposed, and wherein
   the introduction path includes a first introduction path for introducing the lubricating oil scooped up by the ring gear of the differential gear mechanism during backward running of the vehicle to the large diameter gear of the gear mechanism, and a second introduction path for introducing the lubricating oil scooped up by the large diameter gear of the gear mechanism into the catch tank.

3. The vehicle drive device according to claim 2, wherein the ring gear of the differential gear mechanism is a helical gear having a plurality of teeth inclined in a rotation direction of the ring gear during backward running of the vehicle from a side surface on the large diameter gear side toward another side surface on the side opposite to the large diameter gear side of the ring gear.

4. The vehicle drive device according to claim 2, wherein the casing is provided with a first oil guide member guiding the lubricating oil scooped up by the ring gear of the differential gear mechanism along the first introduction path toward the large diameter gear of the gear mechanism.

5. The vehicle drive device according to claim 2, wherein the casing is provided with a second oil guide member guiding the lubricating oil scooped up by the large diameter gear of the gear mechanism along the second introduction path toward the catch tank.

6. The vehicle drive device according to claim 2, wherein the catch tank includes a first storage portion storing the lubricating oil scooped up by the ring gear of the differential gear mechanism during backward running of the vehicle, a second storage portion storing the lubricating oil scooped up by the ring gear of the differential gear mechanism during forward running of the vehicle, and a connecting portion connecting the first storage portion and the second storage portion.

7. The vehicle drive device according to claim 1, wherein the catch tank is disposed above the oil pump in the casing.

* * * * *